United States Patent
Smetters et al.

(10) Patent No.: US 7,904,720 B2
(45) Date of Patent: Mar. 8, 2011

(54) SYSTEM AND METHOD FOR PROVIDING SECURE RESOURCE MANAGEMENT

(75) Inventors: Diana Kathryn Smetters, Belmont, CA (US); Warren Keith Edwards, San Francisco, CA (US); Dirk Balfanz, Menlo Park, CA (US); Hao-Chi Wong, San Carlos, CA (US); Mark Webster Newman, San Francisco, CA (US); Jana Zdislava Sedivy, Palo Alto, CA (US); Trevor Smith, San Francisco, CA (US); Shahram Izadi, Bicester (GB)

(73) Assignee: Palo Alto Research Center Incorporated, Palo Alto, CA (US)

( * ) Notice: Subject to any disclaimer, the term of this patent is extended or adjusted under 35 U.S.C. 154(b) by 951 days.

(21) Appl. No.: 10/289,528

(22) Filed: Nov. 6, 2002

(65) Prior Publication Data

US 2004/0088548 A1    May 6, 2004

(51) Int. Cl.
*H04L 9/32* (2006.01)
*H04L 9/12* (2006.01)
*H04L 9/00* (2006.01)

(52) U.S. Cl. ......... 713/175; 713/168; 713/169; 713/170; 713/173; 713/174; 713/165; 726/2; 726/3; 726/26; 726/27; 726/28; 726/29; 726/30

(58) Field of Classification Search .................. 713/175; 726/29, 28
See application file for complete search history.

(56) References Cited

U.S. PATENT DOCUMENTS

| | | | |
|---|---|---|---|
| 5,408,250 A | 4/1995 | Bier | |
| 5,519,778 A | 5/1996 | Leighton et al. | |
| 5,539,824 A | 7/1996 | Bjorklund et al. | |
| 5,862,321 A * | 1/1999 | Lamming et al. | 709/200 |
| 6,064,741 A | 5/2000 | Horn et al. | |
| 6,075,860 A | 6/2000 | Ketcham | |
| 6,105,133 A | 8/2000 | Fielder et al. | |
| 6,243,373 B1 | 6/2001 | Turock | |
| 6,243,772 B1 | 6/2001 | Ghori et al. | |
| 6,289,460 B1 * | 9/2001 | Hajmiragha | 726/28 |

(Continued)

FOREIGN PATENT DOCUMENTS

WO        WO 99/41876        8/1999

(Continued)

OTHER PUBLICATIONS

U.S. Appl. No. 60/480,909 entitled "Methods and Apparatus for Establishing and Using a Secure Credential Infrastructure" to Diana K. Smetters et al., filed Jun. 24, 2003.

(Continued)

*Primary Examiner* — Syed A. Zia

(57) ABSTRACT

System and method for providing secure resource management. The system includes a first device that creates a secure, shared resource space and a corresponding root certificate for the shared space. The first device associates one or more resources that it can access with the shared space. The first device invites one or more other devices to join as members of the space, and establishes secure communication channels with the devices that accept this invitation. The first device generates a member certificate for each accepting device, and sends the root certificate and the generated member certificate to the device through the secure channel. These devices may then access resources associated with the shared space by presenting their member certificates. Further, members of the shared space may invite other device to join the space, and may create member certificates in the same manner as the first device.

41 Claims, 6 Drawing Sheets

U.S. PATENT DOCUMENTS

| | | | |
|---|---|---|---|
| 6,366,654 B1 | 4/2002 | Cramer et al. | |
| 6,839,843 B1* | 1/2005 | Bacha et al. | 713/176 |
| 6,971,017 B2* | 11/2005 | Stringer et al. | 713/182 |
| 7,003,550 B1* | 2/2006 | Cleasby et al. | 709/205 |
| 7,185,199 B2* | 2/2007 | Balfanz et al. | 713/168 |
| 7,206,934 B2* | 4/2007 | Pabla et al. | 713/168 |
| 7,254,608 B2* | 8/2007 | Yeager et al. | 709/203 |
| 7,401,152 B2* | 7/2008 | Traversat et al. | 709/230 |
| 7,546,359 B2* | 6/2009 | Tierney et al. | 709/223 |
| 7,549,047 B2* | 6/2009 | Balfanz et al. | 713/169 |
| 7,558,797 B2* | 7/2009 | Li | 1/1 |
| 7,562,232 B2* | 7/2009 | Zuili et al. | 713/194 |
| 7,631,184 B2* | 12/2009 | Ryan | 713/160 |
| 7,673,143 B1* | 3/2010 | Yeager et al. | 713/175 |
| 7,711,775 B2* | 5/2010 | Tavis et al. | 709/205 |
| 7,729,995 B1* | 6/2010 | Alain et al. | 705/71 |
| 2001/0048744 A1 | 12/2001 | Kimura | |
| 2002/0061748 A1 | 5/2002 | Nakakita et al. | |
| 2002/0065065 A1 | 5/2002 | Lunsford et al. | |
| 2002/0094087 A1 | 7/2002 | Dellmo et al. | |
| 2002/0112164 A1* | 8/2002 | Schmeling et al. | 713/176 |
| 2002/0147920 A1 | 10/2002 | Mauro | |
| 2002/0156795 A1 | 10/2002 | Edwards et al. | |
| 2002/0159598 A1 | 10/2002 | Rubinstein et al. | |
| 2003/0014646 A1 | 1/2003 | Buddhikot et al. | |
| 2003/0051140 A1 | 3/2003 | Buddhikot et al. | |
| 2003/0078072 A1 | 4/2003 | Serceki et al. | |
| 2003/0081774 A1 | 5/2003 | Lin et al. | |
| 2003/0117985 A1 | 6/2003 | Fujii et al. | |
| 2003/0196087 A1* | 10/2003 | Stringer et al. | 713/171 |
| 2003/0217264 A1* | 11/2003 | Martin et al. | 713/156 |
| 2004/0024787 A1 | 2/2004 | Edwards et al. | |
| 2004/0024809 A1 | 2/2004 | Edwards et al. | |
| 2004/0044727 A1* | 3/2004 | Abdelaziz et al. | 709/203 |
| 2004/0088548 A1 | 5/2004 | Smetters et al. | |

FOREIGN PATENT DOCUMENTS

| | | |
|---|---|---|
| WO | 0124059 A2 | 5/2001 |

OTHER PUBLICATIONS

U.S. Appl. No. 10/231,194 entitled "Apparatus and Methods for Providing Secured Communication" to Dirk Balfanz et al., filed Aug. 30, 2002.

U.S. Appl. No. 10/424,191 entitled "System and Method for Establishing Secondary Channels" to Conley et al.

U.S. Appl. No. 10/656,439 entitled "Method, Apparatus, and Program for Securely Presenting Situation Information" to Smetters et al.

U.S. Appl. No. 10/656,551 entitled "Method, Apparatus, and Program Product for Provisioning Secure Wireless Sensors," to Smetters et al.

Asokan et al., "Key Agreement in Ad-Hoc Networks," *Computer Communications*, Elsevier Science Publishers BV, Amsterdam, NL, 23(17):1627-1637 (2000).

Bardram et al., "Context-Aware User Authentication—Supporting Proximity-Based Login in Pervasive Computing," A.K. Dey et al. (Eds.): UbiComp 2003, LNCS 2864, pp. 107-127 (2003).

Kindberg et al., "Secure Spontaneous Device Association," A.K. Dey et al. (Eds.): UbiComp 2003, LNCS 2864, pp. 124-131 (2003).

Schneier, B., "Applied Cryptography: Protocols, Algorithms, and Source Code in C," in Section 8.3 "Transferring Keys," John Wiley & Sons, New York, US, (1996).

Stajano et al., "The Resurrecting Duckling: Security Issues for Ad-hoc Wireless Networks," AT&T Software Symposium, 'Online!' pp. 1-8 (1999).

Balfanz, D. et al., "Talking to Strangers: Authentication in Ad-Hoc Wireless Networks," Xerox Palo Alto Research Center, [Retrieved from the Internet at http://www.isoc.org/isoc/conferences/ndss/02/proceedings/papers/balfan.pdf on Feb. 18, 2003] (Posted on the Internet on Feb. 11, 2002).

Lopes, C. et al., "Aerial Acoustic Communications," IEEE Workshop on Applications of Signal Processing to Audio and Acoustics, pp. 21-24, (2001).

Whitehead, Jr., E. et al., "Lessons from WebDAV for the Next Generation Web Infrastructure," Department of Information And Computer Science, University of California [Retrieved from the Internet at http://www.ics.uci.edu/ejw/http-future/Whitehead/http_pos_paper.html on Sep. 20, 2002].

Fielding, R. et al., "Web-Based Development of Complex Information Products," Communications Of The ACM, vol. 41, No. 8, pp. 84-92 (1998).

Dridi, F. et al., "How to Implement Web-Based Groupware Systems Based on WebDAV," Published in Proc. of WETICE 99, IEEE $8^{th}$ Intl. Workshops on Enabling Technologies: Infrastructure for Collaborative Enterprises, Standford, CA, pp. 1-7 (1999).

Whitehead, J. et al., "WebDAV, A Network Protocol for Remote Collaborative Authoring on the Web," pp. 1-21 (1999) [Retrieved from the Internet at http://citeseer.nj.nec.com/whitehead99webdav.html on Mar. 11, 2003].

U.S. Appl. No. 10/066,699 to Balfanz et al., filed Feb. 6, 2002.

U.S. Appl. No. 10/301,931 to Balfanz et al. filed Nov. 21, 2002.

Geer, Daniel E. et al. "Token-Mediated Certification and Electronic Commerce", Proceedings of the Second USENIX Workshop on Electronic Commerce, Oakland, California, Nov. 1996.

Kindberg, Tim and Zhang, Kan "Validating and Securing Spontaneous Associations between Wireless Devices" HP Laboratories, Palo Alto, HPL-2002-256, Hewlett-Packard Company, Sep. 12, 2002.

"ACC: Automatic Cryptographic Configuration of Embedded Devices" XML Trust Center White Paper Feb. 19, 2002, http://research.verisign.com/Papers/ACC1.html.

* cited by examiner ated with
SYSTEM AND METHOD FOR PROVIDING SECURE RESOURCE MANAGEMENT

FIELD

This invention relates generally to digital data processing among digital processing systems and, more particularly, to a method and system for determining which of a plurality of components of digital data processing systems contending for access to a shared resource shall be granted access based upon a predetermined criteria.

BACKGROUND

There is no current approach that makes it simple and easy to securely access arbitrary resources, such as media streams, cameras, files and printers. Moreover, there is no current system that allows end users to intuitively specify how they would like to secure access to resources. Some systems allow granting access rights to users by creating Access Control Lists ("ACLs"). ACLs allow people to specify users who will be allowed access and their specific access rights with respect to system resources, such as making a shared file accessible for viewing and editing to a group of named users. But in many systems, users cannot simply give an arbitrary group of users privileges without requiring system administrator intervention or a great deal of effort. For instance, in a UNIX environment, users cannot create a new system group. In an MS Windows environment, users can add arbitrary lists of domain users to the ACL for a file, but cannot reuse that particular ACL for multiple files without having to explicitly list them all for each file. Users also have no way to allow explicit access to particular individuals who are not a member of their security domain. The only way to allow these individuals access would be to allow everyone access. Without the ability to easily provide secure access to files, for example, other approaches must be attempted.

One approach includes sending files as e-mail attachments where the sender is located in a first security domain and the recipient is located in a second security domain. But this would involve complex user configuration, such as for exchanging keys and certificates, to ensure that the files are exchanged securely. Further, both parties must have access to their mail server, which may not always be possible in real-time. Additionally, the delays and bandwidth requirements involved in transporting the files may be unacceptable due to network congestion. Thus, in this example much effort is expended in simply setting up the security technology instead of towards the goal of exchanging files.

Another approach for securely sharing resources includes a first user at a first machine placing documents they wish to share with a second user at a second machine in a password-protected area of a Web server. The first user can send the second user the URL of the shared documents along with the password, allowing the second user to access the shared documents. This approach has a number of drawbacks, such as requiring the second user to remember the URL and the password to access the shared documents, and making it difficult for users to ascertain exactly which resources are shared and with whom they are shared by. Determining this would require investigating the Web server's file space, logs and permissions files.

The approaches discussed above provide mechanisms by which two users can share static documents. Users may, however, desire sharing a variety of other resources to which they have access to. Additionally, it is generally difficult or impossible for users to easily ascertain which resources are being shared and with whom they are being shared with. For example, users cannot determine who has access to certain files unless they explicitly search for the files on their system. Also, users who intend to allow temporary access to their files, for instance, may inadvertently allow that access to indefinitely continue or may instead accidentally allow access to unintended files.

SUMMARY

A method and a program storage device readable by a machine and tangibly embodying a program of instructions executable by the machine in accordance with embodiments of the present invention includes obtaining a first representation of a shared space at a first member. The first member accesses a first set of one or more resources associated with the shared space and accessible to the first member through the first representation. Further, one or more of the first, a second and other members provide the first representation with access to the resources.

A system in accordance with embodiments of the present invention includes a first representation of a shared space located at a first member. The shared space has a first set of one or more resources, which are accessible to the first member through the first representation. Moreover, the resources are accessible to the first representation through one or more of the first, the second and other members.

The present invention offers a number of advantages, such as providing an easy way for operators to securely share resources, such as documents, data, services and devices. Further, the invention makes it simple and easy for clients to securely access arbitrary resources. Operators can intuitively specify how they would like to secure access to resources. Additionally, the details of the underlying security technologies utilized by the present invention are transparent to the operators. The setting of the security rights for sharing resources in this invention happens implicitly, and thus operators do not have to concern themselves with explicitly setting security rights for each resource they wish to share.

The present invention also advantageously combines visibility with access, eliminating the need for operators to explicitly provide separate access rights for visibility and use. If an operator simply becomes aware of the presence of a resource, then the operator can access the resource. Any user can easily and immediately see what resources they are sharing with others. Furthermore, members of a shared resource group are not concerned with other members being able to see which resources they are sharing since these members will often be working towards accomplishing a common task, and thus they will want to know about and share information about each other's activities.

DETAILED DESCRIPTION

Figure 1:
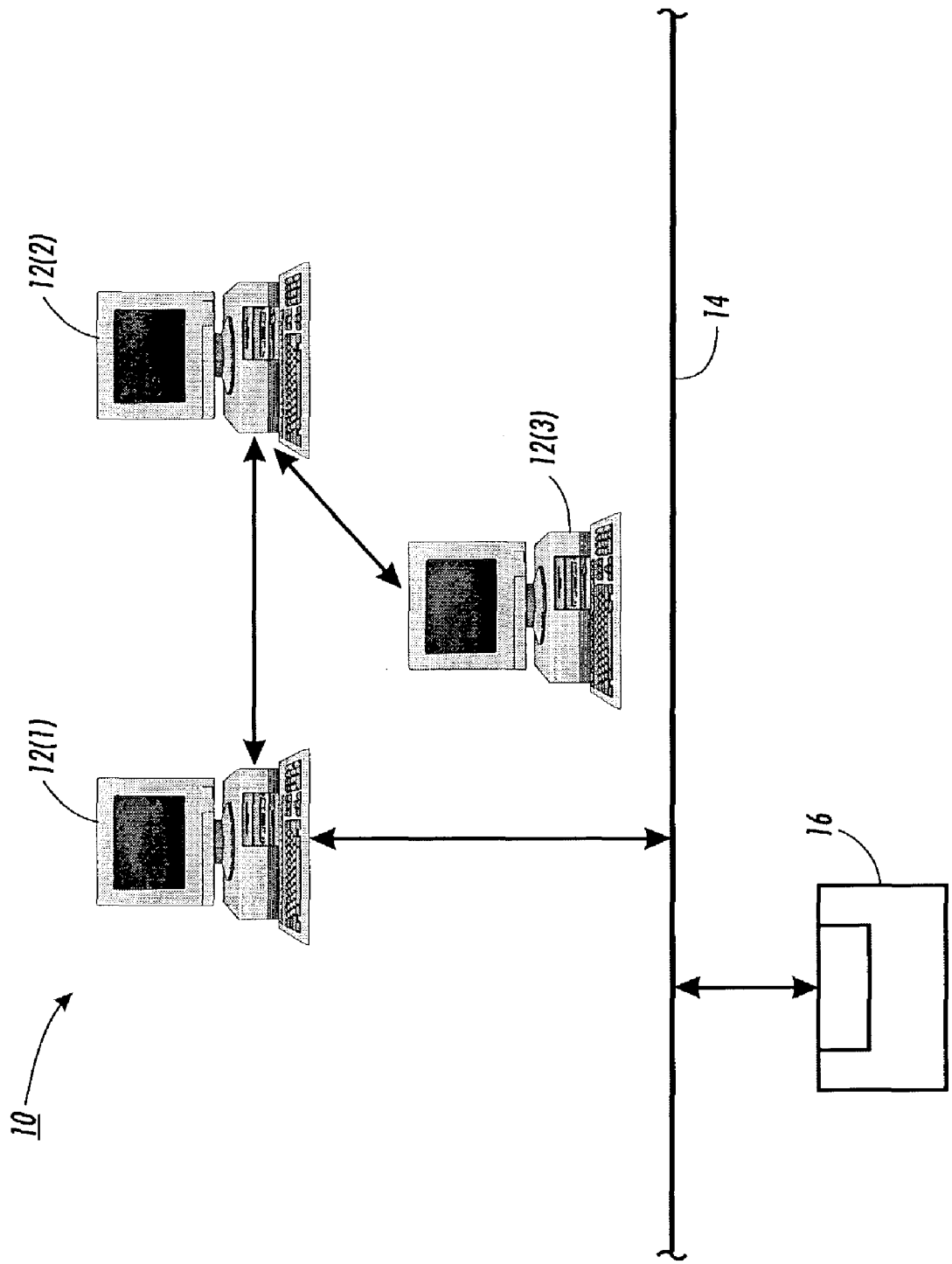
FIG. 1 is a diagram of a system for providing secure resource management in accordance with embodiments of the present invention.

A method and system 10 for providing secure resource management in accordance with embodiments of the present invention are shown in FIGS. 1-6. In embodiments of the present invention, system 10 includes laptops 12(1), 12(2), network 14 and printer 16. A method includes a laptop 12(1) using encryption and authentication techniques during creation of a shared space 20. The laptop 12(1) associates one or more resources 22, 24 with the space 20, adds one or more members to the space 20, such as the laptops 12(2), 12(3), and permits one or more of the members who can prove membership by presenting one or more certificates 30, 40, 50 to access the resources associated with the space 20. The system 10 has a number of advantages, including providing an easy way for operators at devices to easily and securely share resources, such as data, services and devices. Further, details of the underlying security infrastructures utilized by the system 10 are hidden from the operators' environment.

Referring more specifically to FIG. 1, laptops 12(1), 12(2) each comprise a portable computing device that performs a variety of functions, such as file management, word processing, information processing and display, electronic messaging, telephony, facsimile transmissions, or networking, although other types or numbers of devices can be used. Laptops 12(1), 12(2) each include a processor, an I/O unit, a memory and mechanisms for reading data stored in the memory, which are coupled together by one or more buses, although other coupling techniques may be used. These elements are used by each of the laptops 12(1), 12(2) to store and process instructions in accordance with embodiments of the present invention as described and illustrated further herein.

The memory comprises volatile memory and non-volatile memory. The volatile memory comprises random access memory, although dynamic random access memory or flash memory may be used, while the non-volatile memory comprises a fixed data storage medium, such as a hard-disk, although a portable data storage medium may be used, such as a floppy-disk, compact-disc, digital-video disc, magnetic tape or optical disc. The memory stores instructions and data for performing the present invention for execution by the processor, although some or all of these instructions and data may be stored elsewhere.

The I/O unit in each of laptops 12(1), 12(2) has one or more ports capable of sending and receiving range-limited signals, such as RF, to enable the laptops 12(1), 12(2) to communicate with each other using the signals, although other types of signals may be used, such as infrared, contact or audio. Further, the I/O unit may have one or more other ports capable of sending and receiving data to and from network 14. In this example, the laptops 12(1), 12(2) are each connected to the network 14 at one or more of these other ports. Since devices, such as laptops 12(1) and 12(2), are well known in the art, the specific elements, their arrangement within laptops 12(1), 12(2) and operation will not be described in detail here.

Network 14 comprises a wireless network, such as a Bluetooth™ network, although network 14 may also include other types of wireless and wire-based networks, such as the Internet. Moreover, network 14 enables laptops 12(1), 12(2) to communicate with each other, and any other devices with access to the network 14, such as computers or printers (not illustrated).

Printer 16 comprises a network printing device capable of rendering graphical and/or textual representations on a printing medium, although other types and numbers of devices can be used. The printer 16 is coupled to the network 14, and may communicate with devices on the network 14 for receiving and processing print requests. Since devices, such as printer 16, are well known in the art, the specific elements, their arrangement within printer 16 and operation will not be described in detail here.

Devices, such as laptops 12(1), 12(2) and printer 16, are provided for exemplary purposes only. In embodiments of the present invention, these devices may comprise other types of devices or systems that can store, process and execute instructions for performing one or more methods of the present invention as will be described in further detail herein. By way of example only, the devices shown in FIG. 1 may also comprise personal digital assistants, scanners, cellular telephones, video camera recorders, audio input/output devices, copier devices, remote control devices, appliances, and file systems or databases residing in a computer system.

Figure 2:
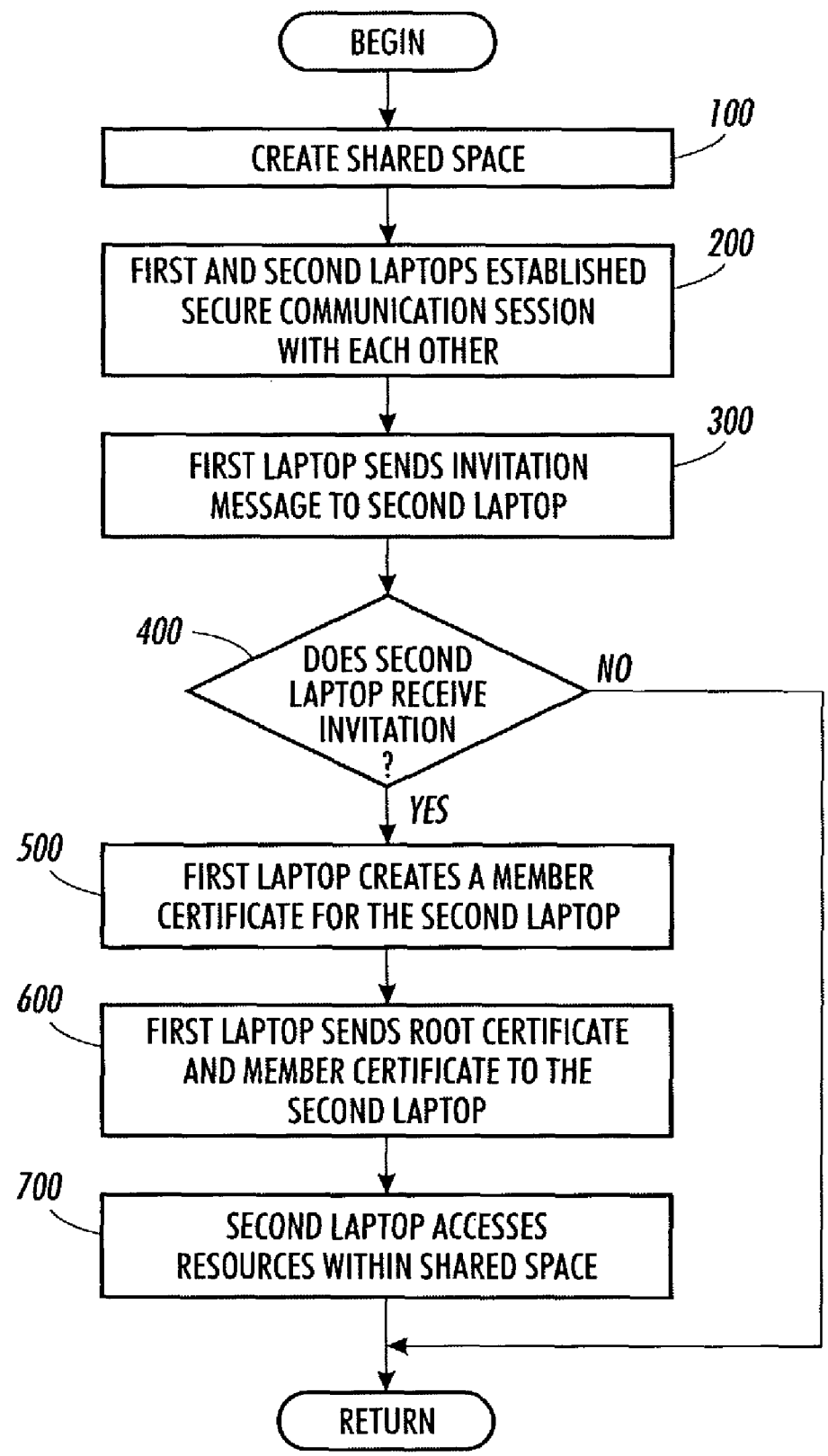
FIG. 2 is a flow chart of a process for providing secure resource management in accordance with embodiments of the present invention.
Figure 3:
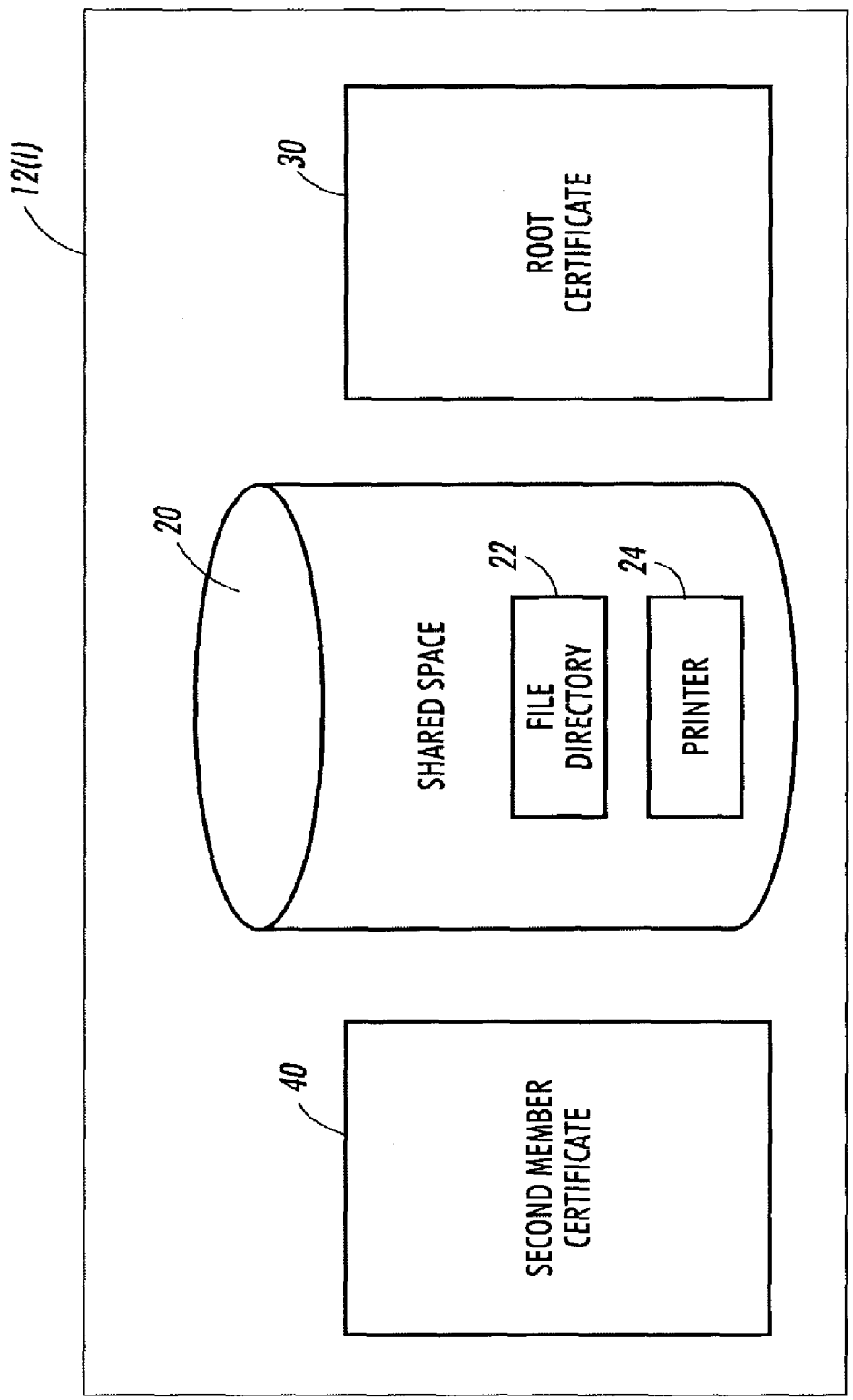
FIG. 3 is a functional block diagram of a portion of the system for providing secure resource management in accordance with embodiments of the present invention.

The operation of the system 10 for providing secure resource management in accordance with embodiments of the present invention will now be described with reference to FIGS. 2-6. Referring specifically to FIGS. 2-3 and beginning at step 100, by way of example only, a user at laptop 12(1) initiates creation of a shared space 20, which at this point in this example includes resources the laptop 12(1) has access to and wishes to share with a designated group of other devices, such as the laptop 12(2). Moreover, each of laptops 12(1), 12(2) at any given point in this example have their own representation of the space 20, which may change and appear differently to each device. Further, in embodiments of the present invention, the set of resources associated with shared space 20 is dynamic so that once the space 20 and its credentials have been created, described further herein below at step 120, members of the space 20 can add resources to the space, thus causing them to be shared and then remove them later as desired, causing them to no longer be shared. These resources may include one or more services, documents and/or data, such as a file directory resource 22, as shown in FIG. 3. The file directory 22 represents a local file listing with respect to laptop 12(1), which laptop 12(1) has access to in this example.

Figure 4:
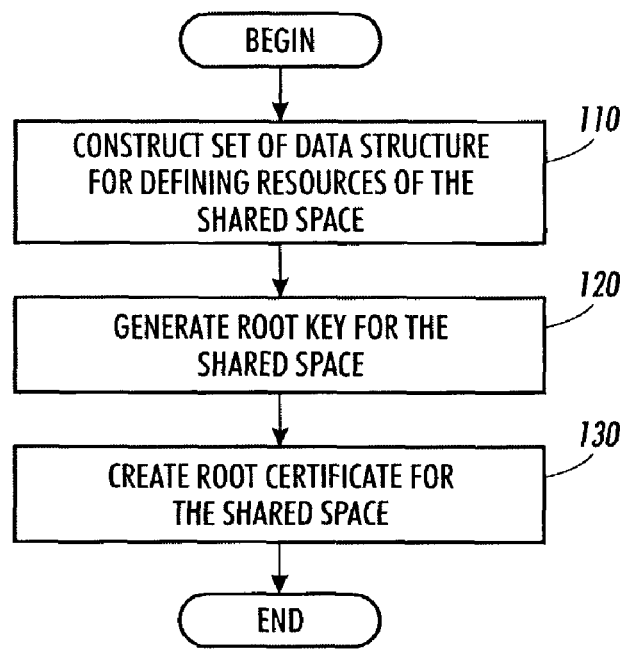
FIG. 4 is a flow chart of a process for creating a shared space used in a system for providing secure resource management in accordance with embodiments of the present invention.

Referring to FIG. 4, at step 110, laptop 12(1) generates a set of data structures for storing information that defines the shared space 20, and these data structures are organized within the laptop 12(1) memory. In particular, the data structures include information describing each resource 22 associated with the shared space 20. At step 120, the laptop 12(1) generates a root key pair that will be used for authentication and encryption purposes with respect to providing devices with access to the shared space 20, although the laptop 12(1) may select an existing root key pair that it wishes to use. At step 130, the laptop 12(1) then generates a root certificate 30 for the new space 20, and digitally signs the certificate 30. Any necessary secrets or keys, such as the root key created at step 120, or supporting information required by the particular credentialing mechanism utilized by the system 10, described herein below, are used by the laptop 12(1) in generating the root certificate 30.

The system 10 utilizes standard cryptographic authentication techniques and creates a public key infrastructure ("PKI") in a manner described herein below to allow members of a shared space 20 to prove their membership to each other, although other authentication and cryptographic techniques may be used, such as group signature schemes, identity-based encryption, storage of lists of public keys or pre-existing certificates, shared secrets, or anonymous credentials. In embodiments of the present invention, X.509 public key certificates are used as described herein, although other certificate types, such as XML certificates, SPKI certificates, WTLS certificates or attribute certificates may be used.

An X.509 "BasicConstraints" extension or other designator may be included in the root certificate 30, and other designated member certificates issued by the root, as described herein, to indicate that the holder of such a designated certificate is authorized to issue certificates to others for granting access to the shared space 20, as will be described in further detail herein, although a corresponding extension in the other types of certificates mentioned above may be used for this purpose. The root certificate 30 may also include an extension that designates the certificate 30 as a group certificate, and provides a friendly name of the group designated by the initiator, laptop 12(1), in this example. Moreover, this extension may include an optional binary identifier for the group, such as a random number. The root certificate 30 is stored in the laptop 12(1) memory for further processing as described further herein.

Figure 5:
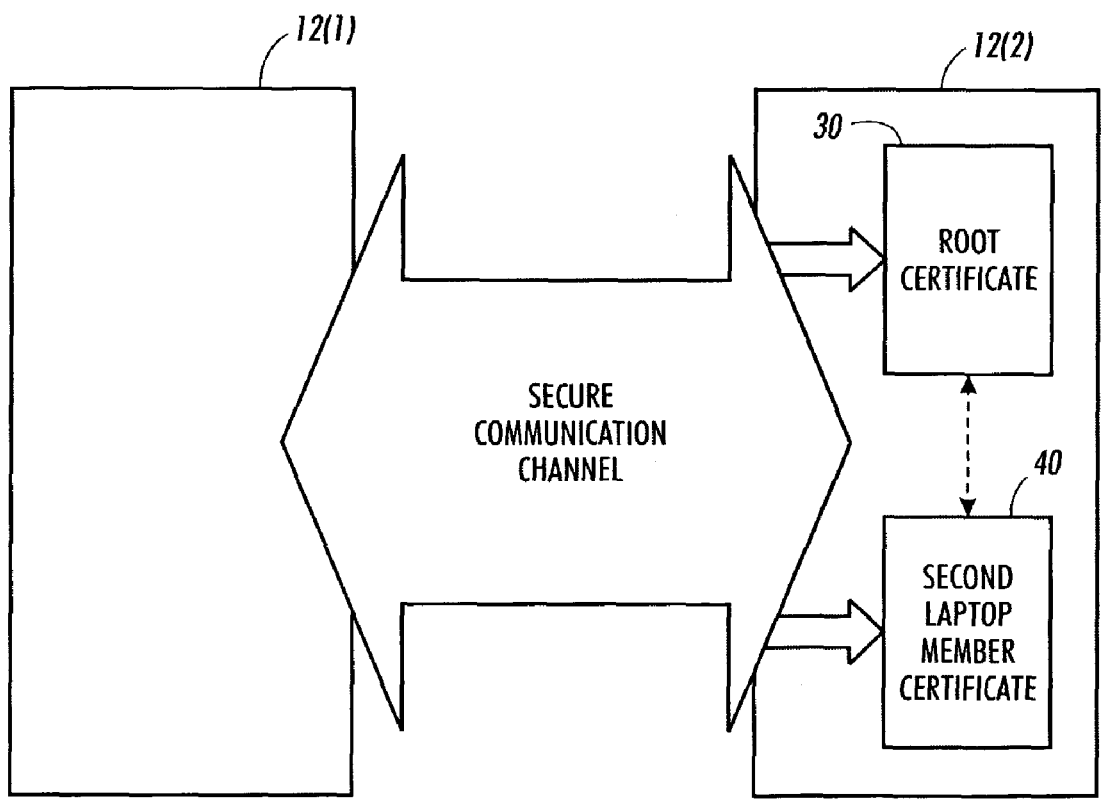
FIG. 5 is a functional block diagram of a portion of the system for providing a member with access to a shared space in accordance with embodiments of the present invention.

Referring back to FIG. 2, and to step 200, the laptops 12(1), 12(2) establish a secure communication channel between each other, as shown in FIG. 5. The laptop 12(1) sends, from one or more of the ports in its I/O unit, range-limited signals, which again may include contact, IR, audio or any other later developed media, although the laptop 12(2) may initially send the signals. In embodiments of the present invention, general wireless channels, such as BlueTooth™ utilized by the network 14 in this example, are inappropriate for such use, as they are subject to undetected "active man in the middle attacks" and are typically insecure towards the laptop 12(2) and other devices. These range-limited signals include encoded digital data representing information that allows the laptops 12(1), 12(2) to find each other on a wireless network, such as a laptop 12(1), 12(2) network address.

The messages also include cryptographic information, such as commitment to or a cryptographic digest of a public key for each of laptops 12(1), 12(2), which will be used to secure further communication between laptops 12(1), 12(2) as described further herein in connection with steps 300-700. The laptops 12(1), 12(2) then perform a public key exchange handshaking protocol, such as SSL/TLS, although other types of handshaking protocols can be performed. In embodiments of the present invention, authenticated is defined as devices, such as laptops 12(1), 12(2), proving to each other that they have possession of a private key corresponding to the public key they committed to during the establishment of the secure communication channel described above.

At step 300, the laptop 12(1) sends an invitation message to laptop 12(2), inviting the laptop 12(2) to accept access to the shared space 20. In response, the laptop 12(2) may be programmed to generate and display a user interface, such as a graphical user interface window, asking an operator of the laptop 12(2) whether they would like to accept this invitation. The laptop 12(2) operator may manipulate a user input device, such as a mouse or keyboard, to indicate whether they would like to accept the invitation from the laptop 12(1) and obtain access to the shared space 20.

At decision box 400, if the laptop 12(2) operator indicates that they would not like to obtain access to the shared space 20 by joining the space 20, the NO branch is followed and the process ends with respect to laptop 12(2) gaining access to the space 20. But if the laptop 12(2) operator indicates that they would like to obtain access to the shared space 20, the YES branch is followed, and at step 500, the laptop 12(1) creates a second laptop member certificate 40 for the laptop 12(2), designating membership of the laptop 12(2) in the space 20, by including information in the second laptop certificate 40. In embodiments of the present invention, the second laptop certificate 40 is the same as the root certificate 30, except as described herein.

Figure 6:
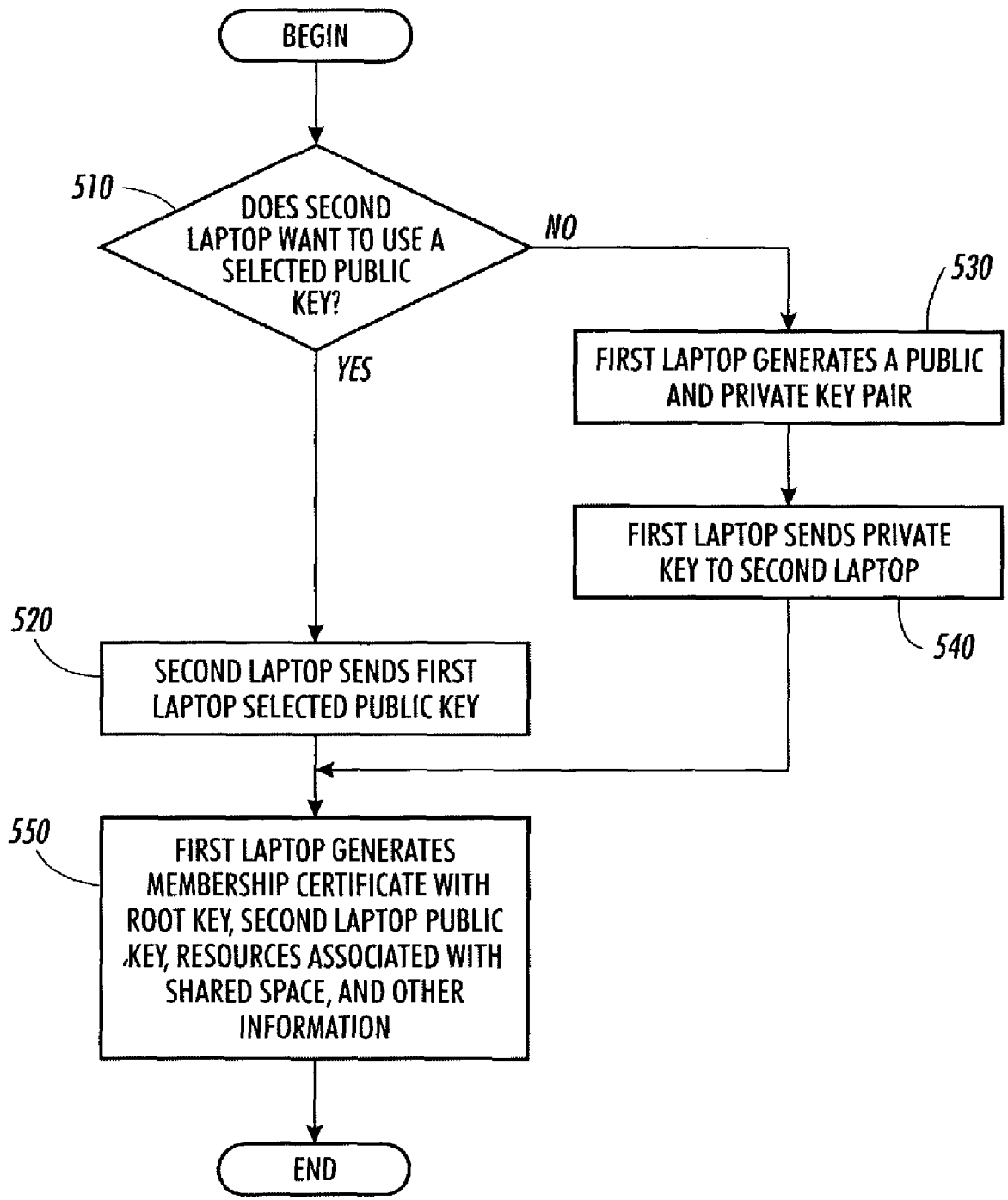
FIG. 6 is a flow chart of a process for creating a member certificate in accordance with embodiments of the present invention.

Referring to FIG. 6 and at decision box 510, the laptop 12(1) may be programmed to ask the laptop 12(2) whether the laptop 12(2) would like the laptop 12(1) to use a particular public key for generating a portion of the second laptop member certificate 40. This may take place transparently unbeknownst to the operators of laptops 12(1), 12(2), in which case the laptops 12(1), 12(2) are configured to communicate with each other, although the laptop 12(2) may be configured to prompt the operator to indicate that a desired key be used. In either case, if the laptop 12(2) responds by indicating that it would like to use a particular public key, then the YES branch is followed. At step 520, the laptop 12(2) sends to the laptop 12(1) the particular public key that the laptop 12(2) would like to use, although the laptop 12(2) may instead indicate that it would like to use the same public key used in the exchange described above at step 200. Step 550 is then performed as described further herein.

If at decision box 510 the laptop 12(2) indicates that it would not like the laptop 12(1) to use a particular public key, then the NO branch is followed. At step 530, the laptop 12(1) generates a public and private key pair, a portion of which will be used for generating a portion of the second laptop member certificate 40, as will be described further herein below in connection with step 550. At step 540, the laptop 12(1) sends the private key corresponding to the key pair generated at step 530 to the laptop 12(2) through the secure communication channel established at step 200 and shown in FIG. 5.

At step 550, the laptop 12(1) completes generation of the second laptop member certificate 40 using either the public key sent from the laptop 12(2) at step 520 or the public key generated by the laptop 12(1) at step 530. Further, the laptop 12(1) includes in the certificate 40 information identifying the location of the shared space 20, such as a URL, any passwords needed to access the shared space 20 at the identified location, and which resources, such as file directory resource 22, the laptop 12(2) is permitted access to. The laptop 12(1) may also include information indicating whether the holder of this certificate 40, laptop 12(2), may invite and grant others access to the shared space 20.

Referring back to FIG. 2 at step 600 and to FIG. 5, the laptop 12(1) sends both the root certificate 30 and the second laptop member certificate 40 to the laptop 12(2). Laptop 12(2) stores these certificates 30, 40 in its memory. The certificates 30, 40 form the laptop 12(2)'s "certificate chain," which the laptop 12(2) uses to prove to other shared space 20 members that the laptop 12(2) is a member of and is therefore authorized to access the space 20, as will be described further herein below in connection with step 700. In the case of the laptop 12(1), for instance, the "certificate chain" is the root certificate 30 alone. The laptop 12(2) creates its own representation of the shared space 20 by generating the data structures necessary to define the space 20 in the same manner as laptop 12(1), as described above in connection with step 110. Therefore, laptops 12(1), 12(2) are now members of the shared space 20.

At step 700, the laptop 12(2) executes program instructions to generate a graphical user interface window (not illustrated) for presenting the contents of the shared space 20 to an operator of the laptop 12(2), although other types of interfaces, including audio or text-based interfaces, may be used. The laptop 12(2) may execute these instructions in response to receiving the certificates 30, 40, as described above in connection with step 600. In embodiments of the present invention, the laptop 12(2) has stored in its memory the instructions for generating the user interface window. The instructions for generating the interface may be stored elsewhere, such as another device, and may be provided dynamically to the laptop 12(2), as disclosed in U.S. patent application Ser. No. 10/212,376 to Edwards et al., titled "SYSTEM AND METHOD FOR CONTROLLING COMMUNICATION," filed Aug. 1, 2002, which is hereby incorporated by reference in its entirety.

In embodiments of the present invention, members of the shared space 20, such as the laptop 12(2), may be added to or deleted from the space 20, as will be described in connection with one or more embodiments further herein below. Moreover, resources, such as the file directory resource 22, may be added to or deleted from the shared space 20, as will also be described in connection with one or more embodiments further herein below. Thus, the laptop 12(2) may update the displayed user interface window to reflect the change in state of the shared space 20 at set periods of time, although the laptop 12(2) may dynamically update the interface window in response to notification signals received from an updating protocol operated by the laptop 12(2), as will be described in connection with one or more embodiments further herein below.

The shared space 20 in this example includes the file directory resource 22, which is provided by the laptop 12(1) as described above in connection with step 100. Thus, the laptop 12(2) may display on its monitor the user interface window representing the shared space 20 with one or more icons representing the resources (not illustrated), such as the file directory resource 22, as disclosed in U.S. patent application Ser. No. 10/212,377 to Edwards et al., titled "SYSTEM AND METHOD FOR ENABLING COMPONENTS ON ARBITRARY NETWORKS TO COMMUNICATE," filed Aug. 1, 2002, which is hereby incorporated by reference in its entirety. The laptop 12(2) has access to the associated resource(s) of the shared space 20, in this case the file directory resource 22, since it can display the interface window representing the space 20 as described above. In this example, an operator of the laptop 12(2) may desire accessing the file directory resource 22, which is accessible through the laptop 12(1).

Thus, a laptop 12(2) operator may use an input device, such as a mouse or keyboard, to select a displayed graphical icon (not illustrated) representing the file directory resource 22. The laptop 12(2) may be configured to detect and respond to the icon selection by executing stored instructions for initiating a data communication session, such as for accessing context data or transferring data with the selected resource, in this case the file resource 22, as disclosed in U.S. patent application Ser. No. 09/838,933 titled "SYSTEM AND METHOD FOR ENABLING COMMUNICATION AMONG ARBITRARY COMPONENTS," filed on Apr. 20, 2001 by Edwards et al., which is hereby incorporated by reference in its entirety, and U.S. patent application Ser. No. 10/212,377 to Edwards et al., titled "SYSTEM AND METHOD FOR ENABLING COMPONENTS ON ARBITRARY NETWORKS TO COMMUNICATE," filed Aug. 1, 2002, which has already been incorporated by reference in its entirety.

The laptop 12(2) communicates with the laptop 12(1) to access the file resource 22 as described further herein. The laptop 12(2) locates the laptop 12(1) and exchanges the cryptographic information established at step 200 to authenticate itself to laptop 12(1) as part of a key exchange protocol, such as SSL/TLS. In particular, the laptop 12(2) shows it possess a root certificate 30 and a member certificate 40 certifying a public key whose private portion is in its possession to the laptop 12(1) to prove it is a member of the shared space 20. If the laptop 12(2), or any other device, cannot prove to the laptop 12(1) that it is a member of the space 20, then the laptop 12(1) rejects the request to access the shared space 20 resource. But in this example, the laptop 12(2) sends the laptop 12(1) its "certificate chain" that includes its member certificate 40 and the certificates indicating that that member certificate 40 was issued by legitimate members of the space authorized to add other members to the space, in this example laptop 12(1). The certificate chain in this example terminates in the root certificate 30 for the space 20.

In addition, the laptop 12(2) should send information sufficient to prove to the laptop 12(1) that it possesses the private key corresponding to the public key present in its member certificate 40. This proof may include a signature on aspects of the messaging exchange between laptop 12(2) and laptop 12(1) as described herein, such as a random value, or nonce, to ensure freshness, although the proof may include demonstrating the ability to decrypt a value encrypted under the public key present in the member certificate 40. Here, the laptop 12(1) created the root certificate 30, and also created and gave the second member certificate 40 to the laptop 12(1). Using the signature or other information provided by laptop 12(2) as described above to prove that it possesses the private key corresponding to the public key in the second member certificate 40, laptop 12(1) can determine that it is communicating with laptop 12(2), the legitimate holder of the certificate 40, rather than an imposter. Thus, the laptop 12(1) concludes that the laptop 12(2) is a member of the shared space 20.

Similarly, laptop 12(1) presents to laptop 12(2) its member certificate chain, in this case the root certificate 30, and proof of possession of the corresponding private key, allowing laptop 12(2) to verify that it is communicating with and requesting resources from a legitimate member of the space 20, rather than an impostor. As a part of their key exchange protocol, laptop 12(1) and laptop 12(2) may additionally create a shared session key to allow them to secure their further communication for this exchange by encrypting, authenticating and protecting the integrity of their communications as described herein.

As a result, the laptop 12(1) permits the authenticated laptop 12(2) to access the file resource 22 to receive a file listing of a directory residing in the laptop 12(1), for example. Laptop 12(1) encrypts this file listing using the session key established between laptop 12(1) and laptop 12(2) during the key exchange protocol described above. Therefore, even if another device that is not a member of the shared space 20 eavesdrops on the communication between the laptops 12(1), 12(2), it would not be able to decrypt the file listing in this example.

Figure 7:
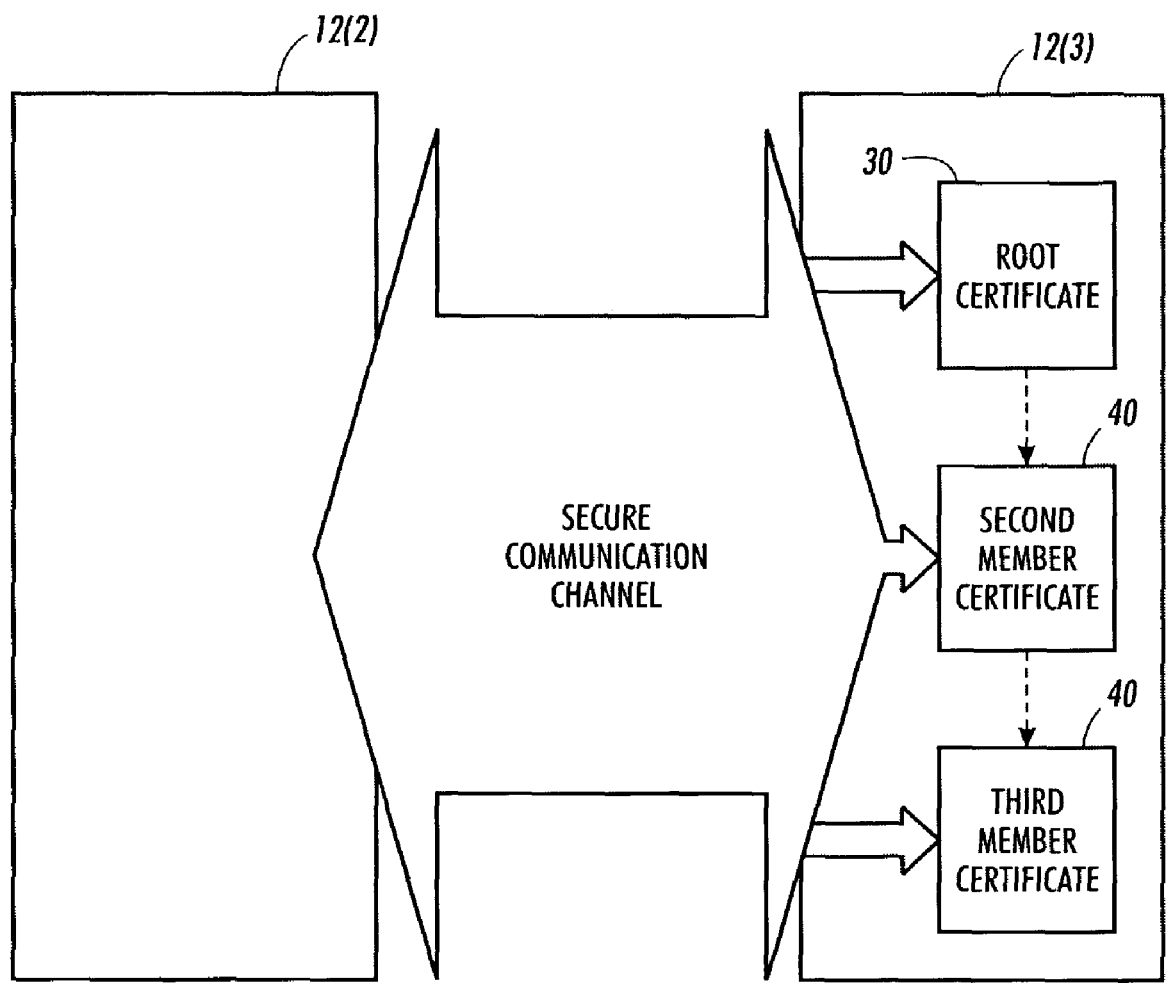
FIG. 7 is a functional block diagram of a portion of the system for providing another member with access to a shared space in accordance with embodiments of the present invention.

An alternative embodiment of system 10 will now be described with reference to FIG. 7. Like reference numbers in FIG. 7 are identical to those in and described with reference to FIGS. 1 and 3. System 10 in this embodiment further includes a laptop 12(3), which is the same as laptops 12(1), 12(2) except for the operation of the laptop 12(3) as described further herein. Steps 100-700 are performed as described above to create the shared space 20 and give access to the space 20 to the laptop 12(2). Referring to FIG. 7 and back to FIGS. 2, 4, and 6, steps 200-700 are then repeated, except the laptop 12(2) operates in place of laptop 12(1), and laptop 12(3) operates in place of laptop 12(2), so that in this embodiment laptop 12(2) gives access to the shared space 20 to the laptop 12(3).

Thus, at step 200 the laptops 12(2), 12(3) establish a secure communication channel between each other. At step 300, the laptop 12(2) sends the laptop 12(3) an invitation message, inviting the laptop 12(3) to accept access to the shared space 20. At decision box 400, the laptop 12(3) accepts the invitation from laptop 12(2). Steps 500-550 are then performed as described above, except the laptop 12(2) creates a third member certificate 50 for the laptop 12(3), and at step 600 the laptop 12(2) sends the "certificate chain" to the laptop 12(3), which in this embodiment comprises the root certificate 30, the second member certificate 40 and the third member certificate 50. At step 700, the laptop 12(3) securely communicates with the laptop 12(1) to access the file directory resource 22, since the resource 22 resides on the laptop 12(1) in this example. Additionally, the laptop 12(3) may access any resources added to the shared space by the laptop 12(2), as will be described in connection with one or more embodiments further herein below, by communicating with the laptop 12(2) in place of the laptop 12(1) in the same manner as described at step 700.

An alternative embodiment of system 10 will now be described with reference to FIGS. 1-7. Steps 100-700 are performed, and steps 200-700 repeated, as described above, to create the shared space 20 and give access to the space 20 to the laptops 12(2), 12(3). By way of example only, an operator of the laptop 12(1) decides to share another resource, such as the printer resource 24 shown in FIG. 3, with the members of the shared space 20, which in this example includes laptops 12(2), 12(3). The printer resource 24 represents the printer 16 on network 14, which laptop 12(1) has access to in this example. The laptop 12(1) need not separately specify access control rights or create an access control list for governing access to the printer resource 24, as explained further herein below.

In embodiments of the present invention, the laptops 12(1), 12(2), 12(3) each may execute program instructions that enables each to perform an epidemic-style updating of information describing the state of the space 20 to each other, although cryptographically secured broadcasts or multicast transmissions and/or cryptographically secured announcements in a discovery service or in a public bulletin board may be utilized. Where secure point-to-group transmission methods are used, such as multicast, special shared keys created by the group initiator, in this example laptop 12(1), are passed down to each new member of the space 20 and are used, although keys that can only be computed by members of space 20 may be used.

In the case of epidemic-style updating as in this example, the space 20 members may begin executing these instructions upon becoming a member of the space 20, although the members may operate these instructions at any point during their membership of the space 20. Thus, in this example the laptop 12(1) passes along information describing the space 20, such as information about who is in the space 20, their location, which resources are available in the space 20 and which members are currently online or off-line, to another space 20 member that it may communicate with, such as the laptop 12(2). Further, the laptop 12(1) sends information to the laptop 12(2) that indicates the availability of the printer resource 24 in the space 20. In turn, the laptop 12(2) passes along its updated knowledge of the current state of the shared space 20 to another space 20 member that it can communicate with securely, such as the laptop 12(3). Thus, as step 700 is performed, one or more of the space 20 members will be able to "see" the printer resource 24 in the user interface window, and therefore can access the resource 24.

The space 20 state information described above may be exchanged securely from the laptop 12(1), to the laptop 12(2), and to the laptop 12(3) by point-to-point synchronization between each device of the type described above in connection with step 200. Further, this synchronization ensures that the laptops 12(1), 12(2), 12(3) providing the space 20 updates are valid members of the space 20, and not unauthorized members or non-members of the space 20. Thus, laptops 12(1), 12(2), 12(3) communicate with each other over a secure channel, such as an SSL/TLS channel, using the credentials received by each upon being adding to the space 20.

These credentials, which include information from one or more of the certificates 30, 40, 50, enable the members to verify to each other that they are a member of the shared space 20. This verification succeeds if the certificates presented are associated with the shared space 20. The certificates may be considered valid if the certificates include the correct unique group identifier for the shared space 20, as described above in connection with step 130, and a valid "certificate chain" is presented. A valid chain demonstrates an unbroken link from the member's certificate, such as the third member certificate 40, to the root certificate 30 for the shared space 20. Further, the members may also verify that none of the certificates in the chain have been revoked if the shared space 20 implements a revocation mechanism, as will be described further herein below.

In embodiments of the present invention, an operator of the laptop 12(1) may no longer desire the inclusion of one or more members of the shared space 20, and may therefore want to remove the member from the space 20. In such an embodiment, the laptop 12(1) generates information representing a revocation list that is passed along to the members of the shared space 20 using the epidemic-style updating process described above.

The shared space 20 members may be configured to confirm the validity of these revocation lists by examining the list to determine whether the creator of the space 20, in this example the laptop 12(1), has digitally signed the revocation list, although the list may be examined to determine whether a set number of members, such as a quorum, have digitally signed the revocation list. Alternatively, instead of revocation lists, the system 10 may utilize rapidly expiring credentials together with the requirement that only a designated set of trusted shared space 20 members be allowed to create new credentials for adding new members so that a revoked member cannot re-credential themselves. Yet another alternative to using revocation lists may include destroying the shared space 20 and recreating the space 20 without including the member to be removed.

In embodiments of the present invention, one of the shared space 20 members may be considered to be mutually trusted by all space 20 members, such as the laptop 12(1), for example, and may act as a server for hosting the shared space 20. Thus, in this example the laptop 12(1) makes access control decisions with respect to who is allowed access the shared space 20. This is distinct from each member operating a service that provides access control to component collections stored on networked servers.

Alternatively, rather than using a mutually trusted member for hosting the shared space 20, a member who is not mutually trusted by the space 20 members, such as laptop 12(3), for example, may be used. In this case, the resources, such as passive documents, may be hosted by the laptop 12(3). Each document in this example is encrypted with a key accessible to other members of the space 20. Further, the laptop 12(3) sends information to the other space 20 members describing where the documents are located, in this example at the laptop 12(3), rather than sending the documents themselves. This information is sent to the members using the epidemic-style updating process described above in connection with one or more embodiments, although the information may be encrypted and sent to a public bulletin board.

In embodiments of the present invention, laptops 12(1), 12(2), 12(3) each may maintain a replicated copy of the contents of the space 20, where the contents may be documents, data or software, for example. This allows the space 20 members to have instant access to the contents of the shared space 20 even if they do not have access to the network 14. Additionally, the updating protocol for ensuring that members receive current state information of the space 20 as described above in connection with one or more embodiments is operated by the laptops 12(1), 12(2), 12(3), although other processes may be used such as peer-to-peer protocols, the epidemic-style updating process described above and protocols that synchronize against a designated "master" copy of the contents of the shared space 20.

In embodiments of the present invention, each member of the space 20 may keep a record log in its memory of operations that it is aware of involving the shared space 20, such as the addition or removal of resources, such as resource 22, 24, or the addition or removal of space 20 members. This information can be used to present a history of the space 20, and can also be used to roll back or undo changes to the space 20. Further, portions of this information may be date or time restricted to requesting space 20 members so that requesting members may only access history information that was compiled while they were members of the space 20. Further, the history information may be encrypted or signed, and additional sets of designated keys may be given to space 20 members to be used for this purpose.

In embodiments of the present invention, one or more shared resource groups may be created apart from the shared space 20, and may exist simultaneously. Moreover, members, such as the laptop 12(1), of one group, such as the shared space 20, may also be associated with other groups simultaneously. Still further, resources, such as the printer resource 24, may be associated with one or more groups as well.

The present invention transparently allows the sharing of resources by creating shared resource groups, such as the shared space 20, using the cryptographic and authentication techniques described above. The resource groups may include resources besides documents, such as devices, software, services and data. Additionally, the details of the underlying security technologies are transparent to the operators of the system 10. The operators can create the resource groups and include resources they deem are semantically related to perform a particular task at hand. For example, an operator might create a resource group to hold a set of documents a group of operators is using for a project. The setting of the security rights for the resource groups in this invention occurs implicitly or incidentally to creating the resource group or when adding members or resources to the group. Thus, operators do not have to worry about explicitly setting security rights for each resource they wish to share.

As a result, the present invention advantageously combines the notion of visibility and access into one. Moreover, separate access rights for visibility and use are not required to be explicitly provided by operators. Thus, if an operator can see a resource, such as the printer resource 24, in a user interface window for a particular resource group, such as the shared space 20, for example, then the operator can select and access the selected resource. Furthermore, shared space 20 members do not have to worry about other members being able to see which resources they are sharing, since members of the same resource group, such as space 20, will often be created to accomplish a common task, and thus they will want to know about each other's activities.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefor, is not intended to limit the claimed processes to any order except as may be specified in the claims.

What is claimed is:

1. A method for managing a secure shared resource between a plurality of computing devices in an ad-hoc network, comprising:

creating at a first member computing device a first representation of a shared space defined by a first set of one or more data structures for storing information describing one or more shared resources included in the shared space, the first representation being unique to the first member computing device;

providing access to a first set of at least one shared resource included in the shared space and accessible to the first member computing device through the first representation to a second member computing device to form a second representation of the shared space unique to the second member computing device, wherein the second member computing device further provides a copy of the second representation to a plurality of member computing devices to form respectively unique representations of the shared space based upon the second representation;

hosting at the first member computing device the first set of shared resources associated with the shared space, the first member computing device being trusted by at least one of the second member computing device and the plurality of other member computing devices, the first member computing device providing at least one of the second member computing device and the plurality of other members with the copy of the first representation; and accessing at least one of the second member computing device and the plurality of other member computing devices the first set of the at least one shared resource associated with the shared space and accessible to the second member computing device and the plurality of other member computing devices through their respective copy of the first representation, the at least one shared resource provided to the first representation copies by at least one of the first member computing device, the second member computing device, and a plurality of other member computing devices.

2. The method as set forth in claim 1 wherein the creating is carried out by at least one of the first member computing device, the second member computing device, and the plurality of other member computing devices.

3. The method as set forth in claim 1 further comprising establishing a secure communication channel between the first member computing device and at least one of the second member computing device and the plurality of other member computing devices.

4. The method as set forth in claim 3 wherein the establishing the secure communication channel further comprises using range-limited signals to transfer a commitment to a public key between the first member computing device and at least one of the second member computing device and the plurality of other member computing devices.

5. The method as set forth in claim 3 further comprising creating a set of credentials at the first member computing device for authorizing at least one of the first member computing device, the second member computing device and the plurality of other member computing devices to access the first representation of the shared space, and providing the set of credentials to at least one of the second member computing device and the plurality of other member computing devices through the secure communication channel.

6. The method as set forth in claim 1 further comprising:
accessing at the second member computing device a second set of at least one shared resource associated with the shared space and accessible to the second member computing device through the second representation, the second set of at least one shared resource provided to the second representation by at least one of the first member computing device, the second member computing device, and the plurality of other member computing devices.

7. The method as set forth in claim 6 wherein at least one of the first member computing device, the second member computing device and the plurality of other member computing devices associates a third set of at least one shared resource with the shared space.

8. The method as set forth in claim 1 wherein the first member computing device provides a first current state information of the shared space to the second member computing device.

9. The method as set forth in claim 8 wherein at least one of the plurality of other member computing devices provides a second current state information to at least one of the first member computing device and the second member computing device.

10. The method as set forth in claim 1 wherein the first member computing device is configured to dissociate at least one of the second member computing device and the plurality of other member computing devices from the shared space.

11. The method as set forth in claim 1 wherein at least one of the first member computing device, the second member computing device, and the plurality of other member computing devices store a copy of the first set of the at least one shared resource of the shared space.

12. The method as set forth in claim 1 wherein at least one of the first member computing device, the second member computing device, and the plurality of other member computing devices maintain a record log of operations involving the shared space.

13. The method as set forth in claim 1 wherein the first member computing device obtains a representation of at least one other shared space.

14. A non-transitory computer-readable medium having stored thereon instructions, which when executed by at least one processor, causes the processor to perform:

creating at a first member computing device a first representation of a shared space defined by a first set of one or more data structures for storing information describing one or more resources included in the shared space, the first representation being unique to the first member computing device;

providing access to a first set of at least one shared resource included in the shared space and accessible to the first member computing device through the first representation to a second member computing device to form a second representation of the shared space unique to the second member computing device, wherein the second member computing device further provides a copy of the second representation to a plurality of member computing devices to form respectively unique representations of the shared space based upon the second representation;

hosting at the first member computing device the first set of shared resources associated with the shared space, the first member computing device being trusted by at least one of the second member computing device and the plurality of other member computing devices, the first member computing device providing at least one of the second member computing device and the plurality of other member computing devices—with the copy of the first representation; and accessing at least one of the second member computing device and the plurality of other member computing devices the first set of the at least one shared resource associated with the shared space and accessible to the second member computing device and the plurality of other member computing devices through their respective copy of the first representation, the at least one shared resource provided to the first representation copies by at least one of the first member computing device, the second member computing device, and a plurality of other member computing devices.

15. The medium as set forth in claim 14 wherein the creating is carried out by at least one of the first member computing device, the second member computing device, and the plurality of other member computing devices.

16. The medium as set forth in claim 14 further comprising establishing a secure communication channel between the first member computing device and at least one of the second member computing device and the plurality of other member computing devices.

17. The medium as set forth in claim 16 wherein the establishing the secure communication channel further comprises using range-limited signals to transfer a commitment to a public key between the first member computing device and at least one of the second member computing device and the plurality of other member computing devices.

18. The medium as set forth in claim 16 further comprising creating a set of credentials at the first member computing device for authorizing at least one of the first member computing device, the second member computing device and the plurality of other member computing devices to access the first representation of the shared space, and providing the set of credentials to at least one of the second member computing device and the plurality of other member computing devices through the secure communication channel.

19. The medium as set forth in claim 14 further comprising:
accessing at the second member computing device a second set of at least one shared resource associated with the shared space and accessible to the second member computing device through the second representation, the second set of at least one shared resource provided to the second representation by at least one of the first member computing device, the second member computing device and the plurality of other member computing devices.

20. The medium as set forth in claim 19 wherein at least one of the first member computing device, the second member computing device and the plurality of other member computing devices associates a third set of at least one shared resource with the shared space.

21. The medium as set forth in claim 14 wherein the first member computing device provides a first current state information of the shared space to the second member computing device.

22. The medium as set forth in claim 21 wherein at least one of the plurality of other member computing devices provides second current state information to at least one of the first member computing device and the second member computing device.

23. The medium as set forth in claim 14 wherein the first member computing device is configured to dissociate at least one of the second member computing device and the plurality of other member computing devices from the shared space.

24. The medium as set forth in claim 14 wherein at least one of the first member computing device, the second member computing device, and the plurality of other member computing devices store a copy of the first set of the at least one shared resource of the shared space.

25. The medium as set forth in claim 14 wherein at least one of the first member computing device, the second member computing device and the plurality of other member computing devices maintain a record log of operations involving the shared space.

26. The medium as set forth in claim 14 wherein the first member computing device obtains a representation of at least one other shared space.

27. A system configured to manage a secure shared resource between a plurality of computing devices in an ad-hoc network comprising:
a first representation of a shared space located at a first member computing device defined by a first set of one or more data structures that store information describing one or more resources included in the shared space, the first representation being unique to the first member computing device, the first representation being accessible to a second member computing device to form a second representation of the shared space unique to the second member computing device, wherein the second member computing device further provides a copy of the second representation to a plurality of member computing devices to form respectively unique representations of the shared space based upon the second representation, the shared space has a first set of at least one shared resource included in the shared space,
wherein the first set of shared resources associated with the shared space is hosted at the first member computing device, the first member computing device being trusted by at least one of the second member computing device and the plurality of other member computing devices the first set of the at least one shared resource associated with the shared space being accessible to at least one of the second member computing device and the plurality of other member computing devices through their respective copy of the first representation, the at least one shared resource being provided to the first representation copies by at least one of the first member computing device, the second member computing device, and a plurality of other member computing devices.

28. The system as set forth in claim 27 wherein, the shared space has a second set of at least one shared resource, the second set of at least one shared resource is accessible to the second member computing device through the second representation.

29. The system as set forth in claim 27 further comprising a secure communication channel over which a commitment to a public key is encoded into range-limited signals and transferred between the first member computing device and at least one of the second member computing device and the plurality of other member computing devices.

30. The system as set forth in claim 27 wherein the first member computing device has authorization information that describes at least one of the second member computing device and the plurality of other member computing devices as being valid members of the shared space.

31. The system as set forth in claim 27 wherein at least one of the first member computing device, the second member computing device, and the plurality of other member computing devices has current state information of the shared space.

32. The system as set forth in claim 27 wherein at least one of the first member computing device, the second member computing device and the plurality of other member computing device has a stored copy of the first set of the at least one shared resource of the shared space.

33. The system as set forth in claim 27 wherein at least one of the first member computing device, the second member computing device, and the plurality of other member computing devices has a record log of operations involving the shared space.

34. The system as set forth in claim 27 wherein the first member computing device has a representation of at least one other shared space.

35. The system as set forth in claim 27 wherein the first set of the at least one shared resource is associated with at least one of the first member computing device, the second member computing device and the plurality of other member computing devices.

36. The method as set forth in claim 1, wherein at least one member computing device coupled to the second member computing device is not directly connected to the ad-hoc network.

37. The medium as se forth in claim 14, wherein at least one member computing device coupled to the second member computing device is not directly connected to the ad-hoc network.

38. The system as set forth in claim 27, wherein at least one member computing device coupled to the second member computing device is not directly connected to the ad-hoc network.

39. The method as set forth in claim 1, wherein the shared space is separate from a root certificate stored in the first member computing device.

40. The medium as se forth in claim 14, wherein the shared space is separate from a root certificate stored in the first member computing device.

41. The system as set forth in claim 27, wherein the shared space is separate from a root certificate stored in the first member computing device.

* * * * *